3,641,236
DOSAGE UNIT SUSTAINED RELEASE ORAL POWDERED LITHIUM SALT COMPOSITION FOR MANIC DEPRESSIVE OR DEPRESSIVE ILLNESS PROPHYLACTIC THERAPY
Alec James Coppen, Epsom, Surrey, England, and Jean-Pierre Metral, Paris, France, assignors to Delandale Laboratories Limited, Canterbury, Kent, England
No Drawing. Filed July 15, 1969, Ser. No. 841,964
Claims priority, application Great Britain, July 16, 1968, 33,845/68
Int. Cl. A61k 27/12
U.S. Cl. 424—19                                                7 Claims

ABSTRACT OF THE DISCLOSURE

This invention is concerned with pharmaceutical compositions and methods of making them. In particular, the composition contains principally a lithium salt as medicament and a sustained release agent comprising a mixture of glyceryl mono-, di- and triesters of one or more $C_{16}$–$C_{18}$ straight chain saturated fatty acids. The composition is primarily intended for oral administration in the treatment of manic-depressive or depressive illness and provides a sustained and consistant release of the medicament into the blood stream during the period between successive doses. The method of the present invention consists in making tablets of the composition for oral administration. With a mixture of the dry powdered medicament and a filler is mixed a solution of the sustained release agent. A binding agent is then added, and after drying and granulating a lubricant may be added before finally compressing into tablets.

This invention relates to pharmaceutical preparations, and in particular to preparations which provide a sustained release of medicament into the blood stream over a desired period.

The use of lithium salts in the treatment of manic states, and in particular as a prophylaxis in recurrent manic-depressive or depressive illness, has been known for several years. Unfortunately, lithium is quickly absorbed and excreted, so that to maintain therapeutic plasma levels, the salt must normally be administered three to four times a day. This is not only inconvenient but also dangerous since lithium tends to accumulate in the body and produces severe side effects at blood levels only a little higher than the therapeutic levels. Cases of severe lithium poisoning have been frequently reported. It is an object of the present invention to provide a lithium containing therapeutic composition which need be taken not more than once daily, and which is capable of maintaining a therapeutic blood level of lithium throughout the twenty-four hours.

According to one aspect of the present invention there is provided a pharmaceutical composition comprising:
  (i) A powdered lithium salt,
  (ii) A sustained release agent comprising a mixture of glyceryl mono-, di- and tri-esters of one or more $C_{16}$–$C_{18}$ straight chain saturated fatty acids.
  (iii) Other innocuous compound materials.

Preferably the sustained release agent is present in an amount of from 51 to 61 parts by weight per 100 parts by weight of therapeutically available lithium. The lithium salt is preferably lithium carbonate. The said other innocuous compounds may include a filler such as mannitol, a binding agent such as gum acacia, and a lubricant such as magnesium stearate. The composition may be in a form of tablets comprising a compressed mixture which includes a lubricant and particles of a dried, granulated mixture of binding agent, sustained release material, filler and lithium salt.

According to another aspect of the present invention there is provided a method of forming a sustained release tablet which comprises the steps of:
  (i) Mixing a dry powdered lithium salt and a dry powdered filler,
  (ii) Mixing therewith a solution of a sustained release material, comprising a mixture of glyceryl mono-, di- and tri-esters of one or more $C_{16}$–$C_{18}$ straight chain saturated fatty acids.
  (iii) Adding a solution of a binding agent and kneading the mixture,
  (iv) Drying and granulating the resulting mass,
  (v) Compressing into tablets.

A lubricant may be added to the granules from step (iv) before tabletting. Preferably the sustained release agent is added in an amount of from 51 to 61 parts by weight per 100 parts by weight of therapeutically available lithium. It may be added in alcoholic solution and at an elevated temperature, in which case the mixture of powdered medicament and filler are desirably pre-heated to about this temperature before adding the solution at step (ii). After adding the binding agent and kneading the mixture, the drying is preferably carried out by evaporation. The lithium salt is preferably lithium carbonate.

The sustained release agent will normally be prepared from a mixture of fatty acids. It is important for the present invention that the mixure contains principally $C_{16}$–$C_{18}$ sraight chain saturated fatty acids. In practice, since acids are normally obtained from natural sources, the mixture will contain principally palmitic and stearic acids, and small amounts of other acids outside the stated range will inevitably be present. It is to be understood in the definition of the sustained release agent given in the appended claims that minor amounts of such other acid radicals may be present in quantities which do not significantly effect the function of the sustained release agent.

In order that the present invention may be more clearly understood and readily carried into effect, a specific embodiment, given by way of example only, will now be described.

Delayed release lithium carbonate tablets are made to the following formula:

|  | Parts by wt. |
|---|---|
| Lithium carbonate | 100 |
| Mannitol | 16.5 |
| Precirol [1] | 9.75 |
| Gum acacia | 10 |
| Magnesium stearate | 1.25 |

[1] Precirol is a trade name for a mixture of glyceryl mono-, di- and tri-palmitostearate esters manufactured by Messrs. Gattefosse in France. It is prepared from palmitostearic acids having the approximate composition by weight: stearic acid 46.5%, palmitic acid 51%, lauric acid 2%, and traces of myristic and oleic acids. The final ester composition by weight is mono ester 12–17%, di-ester 43–47% and tri-ester 35–44%, there being less than 1% free glycerol.

The tablets are manufactured in the following way. The mannitol is sieved on a 25 mesh screen (AFNOR)[2]. The sieved mannitol is mixed in a heated tank at about 68° C. with powdered lithium carbonate of pharmaceutical quality (BPC—1949).

[2] Association Francaise de Normalisation.

An alcoholic solution of Precirol is prepared by dissolving 39 grams of Precirol in every 170 ml. of 96° alcohol and bringing the temperature of the solution to about 70° C. and is then poured onto the powdered mixture of mannitol and lithium carbonate at about 68° C., and mixed. An aqueous solution of gum acacia is prepared with one part by weight of gum acacia to two parts by volume of water, and poured onto the mixture, and the whole mass is kneaded. The mass is then dried at 40° C. by evaporation, e.g. in an Aeromatic drier. It is then granulated on a number 10 screen (mesh 2 mm.; wire diameter 0.7 mm.) and dried for a further 5 minutes. The dry mass is then further granulated on a number 16 screen (mesh 1.19 mm.; wire diameter 0.5 mm.). The magnesium stearate is added to the dry granulate and mixed. The mixture is then compressed into tablets on a rotary machine with flat, cup-shaped, and rod-shaped punches. Each tablet should have a weight of about 550 milligrams and contain 400 milligrams of lithium carbonate and 39 milligrams of Precirol.

These tablets can be administered once daily to obtain a sustained therapeutic level of lithium in the blood plasma throughout the twenty-four hour period. Their effectiveness is illustrated by the following tests which have been carried out with these tablets.

TESTS

Tablets of lithium carbonate (400 mg.) were prepared in a slow-release form to give a consistant release over an eight hour period. Tests were carried out on patients after recovery from a depressive illness. The schedule followed for each patient will be seen from the table.

Five patients (No. 1-5) were given 1600 mg. of slow-release lithium at 8:10 a.m. for 9 days. On the first day venous blood samples were obtained at intervals throughout the twenty-four hours. Blood samples were then obtained daily at 8:00 a.m. (before the morning dose of lithium) for the next 7 days. On day 9, blood samples were then taken at intervals during the following 24 hours. No further doses were given on days 10 and 11, but 8:00 a.m. blood samples were taken on these days to obtain information on the decline of the plasma concentration of lithium. One patient (No. 6) was given 800 mgm. daily for 9 days. 8:00 a.m. blood samples were taken at intervals over the following 24 hours.

Two patients (No. 7 and 8) were given a single dose of 800 mgm. of slow release lithium carbonate and blood samples were taken at 8.00 a.m. and intervals for the next 24 hours and at 8:00 a.m. on subsequent days.

Plasma lithium levels were determined by an adaptation of a method reported by Amdisen (Scand. J. Clin. Lab. Invest. Nov. 1967, vol. 20, pt. II, page 104).

The plasma was diluted with a protein precipitant (10% trichloroacetic acid, 10% isopropane) to give a ratio of 1 ml. of plasma to 3 ml. of the precipitant. The diluted plasma was mixed, allowed to stand for 10 minutes and then centrifuged at 1500 G. for 5 minutes. The supernatnant was used for the estimation. Suitable lithium standards and a blank were used, each containing sodium and potassium concentrations similar to those found in plasma. The standards and blank were diluted in the same way as the plasma with protein precipitant. The absorption of samples, standards and blank was read on an SP 90 atomic absorption flame spectrophotometer at 671 mm. using a propane/air flame. The coefficient of variation for 15 samples performed in duplicate was 3.6%.

RESULTS

The results are presented in the table. This gives the average plasma level (obtained from patients 1–5), throughout the 24 hours, after the daily administration of 1600 mgm. of slow release lithium carbonate. It will be seen that plasma levels increased over the first week of the morning administration of slow release lithium carbo-

TABLE

| No. | Age, yrs. | Sex | Daily dose of slow Li (mg.) | Plasma Lithium Levels (meq./l.) on day No. | | | | | | | | | | | | | | | | | | | | | |
|---|---|---|---|---|---|---|---|---|---|---|---|---|---|---|---|---|---|---|---|---|---|---|---|---|---|
| | | | | 1 9 a.m. | 1 11 a.m. | 1 2 p.m. | 1 5 p.m. | 1 8 p.m. | 2 8 a.m. | 3 8 a.m. | 4 8 a.m. | 5 8 a.m. | 6 8 a.m. | 7 8 a.m. | 8 8 a.m. | 9 8 a.m. | 9 9 a.m. | 9 11 a.m. | 9 2 p.m. | 9 5 p.m. | 9 8 p.m. | 9 9 p.m. | 10 8 a.m. | 11 8 a.m. |
| 1 | 61 | F | 1,600 | .15 | .60 | .55 | .45 | .40 | .30 | .60 | .45 | .40 | | | .50 | .40 | .60 | .80 | .75 | .60 | .55 | .55 | .40 | .20 |
| 2 | 63 | F | 1,600 | .05 | .30 | .55 | .45 | .40 | .35 | .50 | .50 | .80 | | | .75 | .60 | .75 | 1.00 | 1.15 | .90 | .85 | .85 | .75 | .40 |
| 3 | 28 | M | 1,600 | .00 | .20 | .40 | .65 | .55 | .75 | .95 | 1.00 | .90 | | | .90 | 1.10 | 1.00 | 1.10 | 1.15 | 1.30 | 1.25 | 1.10 | 1.10 | .65 |
| 4 | 37 | M | 1,600 | .05 | .10 | .10 | .05 | .05 | .10 | .35 | .55 | .75 | | | .60 | .70 | .60 | .70 | .85 | .95 | .90 | .80 | .80 | .55 |
| 5 | 38 | M | 1,600 | .05 | .10 | .25 | .25 | .20 | .15 | .65 | | .50 | | | .65 | .70 | .70 | .65 | .75 | .70 | .65 | .65 | .65 | .45 |
| 6 | 43 | F | 800 | | | | | | .10 | .15 | .05 | .45 | .55 | .55 | .30 | .25 | .30 | .30 | .30 | .30 | .25 | .25 | | |
| 7 | 33 | F | 800 | .10 | .10 | .10 | .10 | .10 | .10 | .05 | | .05 | .40 | .55 | | | | | | | | | | |
| 8 | 50 | M | 800 | .10 | .15 | .10 | .10 | .10 | .10 | .05 | | | | .35 | | | | | | | | | | |

Note.—Patients 1 to 6 were given a single daily dose of slow-release lithium at 8:10 a.m. on days 1 to 9 inclusive. Patients 7 and 8 were given a single daily dose of slow-release lithium at 8:00 a.m. on day 1.

nate—after which a fairly constant concentration is found in the 8:00 a.m. sample. On day 9 the morning dose gave sustained plasma concentration over the subsequent 24 hours. The fall-off on days 10 and 11 was fairly slow and it seems that the omission of a morning dose will not result in a very large decrease (average 35%) in plasma concentration of lithium.

No patients complained of any side effects and it is possible that the slow release form of lithium carbonate prevents the post-absorption side effects some patients complain of, such as intestinal irritation, discomfort or muscular weakness, nausea or abdominal pain.

The dose of slow release lithium carbonate needed to reach the therapeutic plasma concentrations of lithium (0.6–1.5 meq./l.) is somewhat larger than with the usual preparation of lithium carbonate. There was a large difference between the 8:00 a.m. plasma concentration in different individuals after equilibration had been reached and this difference was not related to body size or total body water. However, 1600 mg. of slow release lithium appeared to give concentrations within the desired limits although adjustments in the dose should be made to allow for individual differences.

SUMMARY

A slow release form of lithium carbonate was tested on a group of patients after recovery from a depressive illness. It was found that after about one week an equilibrium was reached and that satisfactory plasma levels were sustained over 24 hours by a morning dose of slow release lithium carbonate. 1600 mg. of slow release lithium carbonate gave satisfactory prophylactic levels in most cases although the final dose may need to be adjusted by following estimations of the plasma concentration of lithium in the individual patient.

What we claim is:

1. A pharmaceutical composition comprising:
   (i) an effective amount per individual dosage unit of a powdered lithium salt, sufficient to obtain a therapeutically effective plasma concentration of lithium.
   (ii) a sustained release agent comprising a mixture of glyceryl mono-, di- and tri-esters of one or more $C_{16}$–$C_{18}$ straight chain saturated fatty acids, and
   (iii) other innocuous compounding materials.

2. A pharmaceutical composition according to claim 1 wherein the sustained release agent is present in an amount of from 51 to 61 parts by weight per 100 parts by weight of therapeutically available lithium.

3. A pharmaceutical composition according to claim 1 wherein the lithium salt is lithium carbonate.

4. A pharmaceutical composition according to claim 1 wherein the lithium salt is lithium carbonate and the innocuous compounding materials include a binding agent, a lubricant and mannitol as a filler, the composition being compressed into tablet form.

5. A pharmaceutical composition according to claim 1 wherein the therapeutic plasma concentration is from 0.6 to about 1.5 meq./l. lithium.

6. A method for prophylactic oral treatment of manic depressive or depressive illness states in patients which consists essentially of the steps of producing, in a patient with a manic depressive or depressive illness state being treated prophylactically, a therapeutically effective plasma concentration of lithium from an individual dosage unit sustained release therapeutic oral powdered lithium salt pharmaceutical composition taken not more than once daily, and which is capable of maintaining a therapeutic blood level of lithium throughout the twenty-four hours, said pharmaceutical composition further comprising:
   (i) a mixture of glyceryl mono-, di- tri- esters of one or more $C_{16}$–$C_{18}$ straight chain saturated fatty acids, and
   (ii) other innocuous compounding material.

7. The method according to claim 6 wherein the therapeutic plasma concentration is from 0.6 to about 1.5 meq./l. lithium.

References Cited

UNITED STATES PATENTS

| | | | |
|---|---|---|---|
| 2,793,979 | 5/1957 | Svedres | 424—22 |
| 2,805,977 | 9/1957 | Robinson et al. | 424—19 |
| 2,875,130 | 2/1959 | Grass et al. | 424—21 X |
| 2,951,792 | 9/1960 | Swintosky | 424—21 |
| 3,108,046 | 10/1963 | Harbit | 424—19 |
| 3,146,167 | 8/1964 | Lantz et al. | 424—19 |
| 3,279,998 | 10/1966 | Raff et al. | 424—19 |

OTHER REFERENCES

Gershon, S. Amer. J. Psychiat. 124 (10), pp. 146–150, April 1968.

Cade, J. Med. J. Aust. 2, pp. 349–352 (1949).

Schou, Metal. J. Neurol. Neurosurg. Psychiat. 17, pp. 250–260 (1954).

Coppen, A., Brit. J. Psychiat. III, pp. 1133–1142 (1965).

Coppen, A. et al., Lanceti, pp. 682–683 (1965).

Coppen, A. et al., Brit Med. J. 2, pp. 1439–1444 (1963).

Coppen, A. et al., Brit. Med. J. 1, pp. 71–75 (1966).

SHEP K. ROSE, Primary Examiner

U.S. Cl. X.R.

424—22, 163